United States Patent
Xu

(10) Patent No.: US 9,708,496 B2
(45) Date of Patent: *Jul. 18, 2017

(54) HIGH VISCOSITY HEAT SENSITIVE INK PRINTING PROCESS

(71) Applicant: Sawgrass Technologies, Inc., Mt. Pleasant, SC (US)

(72) Inventor: Ming Xu, Malvern, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/098,774

(22) Filed: Apr. 14, 2016

(65) Prior Publication Data

US 2016/0230031 A1    Aug. 11, 2016

Related U.S. Application Data

(60) Continuation of application No. 14/132,009, filed on Dec. 18, 2013, now Pat. No. 9,315,681, which is a continuation of application No. 13/597,464, filed on Aug. 29, 2012, now Pat. No. 8,632,175, which is a division of application No. 12/833,383, filed on Jul. 9, 2010, now Pat. No. 8,425,029.

(60) Provisional application No. 61/224,720, filed on Jul. 10, 2009.

(51) Int. Cl.

| C09D 11/322 | (2014.01) |
|---|---|
| C09D 11/328 | (2014.01) |
| C09D 11/38 | (2014.01) |
| B41J 2/21 | (2006.01) |
| B41J 2/175 | (2006.01) |
| C09D 11/02 | (2014.01) |

(52) U.S. Cl.
CPC ............ *C09D 11/38* (2013.01); *B41J 2/17593* (2013.01); *B41J 2/2107* (2013.01); *C09D 11/02* (2013.01); *C09D 11/322* (2013.01); *C09D 11/328* (2013.01)

(58) Field of Classification Search
CPC .......... C09D 11/50; C09D 11/02; C09D 11/38; C09D 11/322; C09D 11/328
See application file for complete search history.

(56) References Cited

U.S. PATENT DOCUMENTS

| 5,488,907 A | 2/1996 | Xu et al. |
|---|---|---|
| 5,640,180 A | 6/1997 | Hale |
| 5,642,141 A | 6/1997 | Hale et al. |
| 5,746,816 A | 5/1998 | Xu et al. |
| 5,830,263 A | 11/1998 | Hale et al. |
| 6,284,004 B1 | 9/2001 | Burglin et al. |
| 6,450,098 B1 | 9/2002 | Hale et al. |
| RE38,952 E | 1/2006 | Hale et al. |
| 8,632,175 B2 | 1/2014 | Xu |
| 2003/0146963 A1 | 8/2003 | Murray |
| 2004/0050288 A1 | 3/2004 | Geary et al. |
| 2005/0199152 A1 | 9/2005 | Hale |
| 2008/0187666 A1 | 8/2008 | Burglin |
| 2009/0092755 A1 | 4/2009 | Valentini et al. |

FOREIGN PATENT DOCUMENTS

| CN | 1157630 | 8/1997 |
|---|---|---|
| CN | 1608113 | 4/2005 |
| CN | 101248146 | 7/2012 |
| JP | H10330661 | 12/1998 |
| JP | 2005281523 | 10/2005 |
| JP | 2008223193 | 9/2008 |
| WO | WO2008103424 | 8/2008 |

*Primary Examiner* — Veronica F Faison
(74) *Attorney, Agent, or Firm* — B. Craig Killough; Barnwell Whaley Patterson & Helms

(57) ABSTRACT

A high viscosity aqueous inkjet ink that is useful in ink jet printers. The ink comprises heat activated colorant solids that are not heat activated during the printing process, and are printed onto a substrate in the form of an image that can be transferred onto a subsequent or final substrate by applying heat and intimate contact between the two substrates. The ink can also be heat activated onto the substrate without further transfer by applying heat at the temperature that is suitable for the activation of the colorant.

11 Claims, No Drawings

HIGH VISCOSITY HEAT SENSITIVE INK PRINTING PROCESS

This Application is a continuation of pending application Ser. No. 14/132,009 filed Dec. 18, 2013, which is a continuation of pending application Ser. No. 13/597,464 filed Aug. 29, 2012, now U.S. Pat. No. 8,632,175, issued Jan. 21, 2014, which is a division of Application Ser. No. 12/833,383, filed Jul. 9, 2010, now U.S. Pat. No. 8,425,029, issued Apr. 23, 2013, which claims the benefit of application Ser. No. 61/224,720 filed Jul. 10, 2009, under 35 USC §119(e), and from which this Application claims priority.

FIELD OF THE INVENTION

This invention relates to a method of inkjet printing of heat activated colorants and an ink comprising heat activated colorants.

BACKGROUND OF THE INVENTION

Inkjet digital printing has been widely used in many applications. Its refined image quality, comparing with conventional analog technologies such as offset printing, screen printing, lithographic printing, and digital inkjet printing technologies generate much convenient, efficient and environmentally clean results.

However, aqueous digital printing on materials other than paper may be inferior to other processes due to lack of color intensity and speed due to some shortcomings of digital inkjet printing methods. Among those, low viscosity, low colorant content aqueous inks with especially small droplet size requires much more ink materials to generate comparable final image output. This is a greater problem when the colorants used in the inkjet ink are not soluble dyes, but are pigments or other insoluble colorants. High color saturation and so called super saturation of the color image may be difficult to achieve when using these inkjet inks.

One means of creating aqueous ink is adding viscosity control agents that are high molecular weight natural synthetic polymers, higher viscosity water soluble or miscible glycols, high alcohols, accompanied by higher concentrations of colorants. Several problems are associated with such a simple approach. The use of high molecular weight polymers may result in an aqueous system that deviates from physical property requirements of the inkjet printer used to print the ink, such as Newtonian fluid behavior; therefore, the ink improperly responds to the jetting mechanism. The high molecular weight polymer in combination with increased levels of colorants, especially non-soluble type of colorants, can create clogging of the print head nozzles, even when using newer print head technology designed for higher viscosity inks, since such printers are not specifically designed for use with colorants that are solids when printed.

Heat activated colorants have been used in digital inkjet printing. The image quality is dependent on how effectively and efficiently the heat activated colorants are transferred or fixed to the substrate. Hale et al., U.S. Pat. No. 5,642,141 and Xu et al., U.S. Pat. No. 5,488,907 teach inkjet printing methods using finely divided heat activated dye solids. These methods incorporate an ink having a viscosity generally around 2 to 4 cP at ambient temperature. These patents do not specifically teach one how to create a high transfer efficiency ink using heat activated dyes and having relatively higher viscosity.

High viscosity inkjet inks may impose further problems for heat activated inks when a high concentration of colorant is present. Agents for controlling or modifying physical properties of the ink may hinder the heat activation efficiency of the colorant, due to high boiling points, affinity for the heat activated dye at the activation temperature, or entrapment/encapsulation of the dye particle due to the long polymeric chain structure of the chemical/agent. These issues may be more pronounced when the particle sizes of the colorants used in the inks are very small. For example, a high concentration of glycerin may alter the heat activation efficiency of a small dye particle under normal heat activation temperature and duration. Further, a thickening agent, such as carboxy methyl cellulose (CMC), may create a non-Newtonian system, while also hindering activation or sublimation of the heat activated dye.

Ink jet printer print heads, including Drop on Demand (DOD) piezoelectric print heads, have nozzles and orifices of varying sizes. These nozzles and orifices dictate droplet size, print speed, and jettable ink viscosity, and also the tolerance to non-soluble colorants or polymeric particulates. An appropriate range of dye particle sizes based on the nozzle or orifice size is important when formulating the higher viscosity heat activated inks.

There is a need for a higher viscosity ink that comprises heat activated dye solids for digital printing, including transfer printing or direct printing, that will not clog the print head, will yield high heat activation efficiency, and be environmentally safe, and which is suitable for high viscosity ink printers, which is printers that require liquid inks having a viscosity of 5.0 centipoise or greater at ambient temperature.

SUMMARY OF THE PRESENT INVENTION

The present invention is a high viscosity inkjet ink that is useful for printing heat activatable images using ink jet printers such as Drop on Demand piezoelectric printers. The ink comprises heat activated colorant solids that are not activated during the inkjet printing process, and are printed onto a substrate in the form of an image that can be activated and transferred to a subsequent or final substrate by applying heat and intimate contact between the two substrates. The ink can also be heat activated onto the substrate without further transfer by applying heat at a temperature that is suitable for the activation of the colorant.

DETAILED DESCRIPTION OF PREFERRED EMBODIMENTS

The present invention is a liquid inkjet ink having a preferred viscosity of not less than 5 cP, and may have a viscosity from 6 to 100 cPs, with total water content of not less than 30% by weight of the total ink formulation. A preferred viscosity range is from 7 cP to 30 cP. A heat activated colorant is present in the ink as printed in the form of solid particles or particulates. The specific amount of the colorant(s) is supplied to achieve proper color intensity and image quality upon heat activation. The colorant is preferred to range from 1% to 15% by weight of the total ink formulation.

In one embodiment, the ink contains a substantial amount of viscosity control solvents/co-solvents such as diol, triol, glycols, polyol, high alcohol, amines, polyamine, amino oxide, etc. either alone or in mixture including but not limited to: glycerin, ethylene glycol, diethylene glycol, triethylene glycol, propylene glycol, dipropylene glycol, caprolactum, polyethylene glycol, polypropylene glycol, urea, sorbitol, 2-pyrrolidinone, N-methylpyrrolidinone, polyvinylpyrrolidinone (PVP), polyvinylalcohol (PVA), gamma-butyrolactone (GBL), 2-methyl-1,3-propanediol, polyethylene polyamines, etc. These are high viscosity water soluble or water miscible solvents/co-solvents that will not substantially change the hydrophilicity of the ink system, but which increase the viscosity of the ink. These materials have little to no tendency to solubilize the heat activated colorants. Furthermore, these solvents, co-solvents, or viscosity control agents will not substantially alter the Newtonian fluid behavior (incompressible) of the aqueous system. This behavior may be expressed by the following equation:

$$\tau_{ij} = \mu\left(\frac{\partial u_i}{\partial x_j} + \frac{\partial u_j}{\partial x_i}\right)$$

with comoving stress tensor $\mathbb{P}$ (also written as σ)

$$\mathbb{P}_{ij} = -p\delta_{ij} + \mu\left(\frac{\partial u_i}{\partial x_j} + \frac{\partial u_j}{\partial x_i}\right)$$

where, $T_{ij}$ is the shear stress on the $i^{th}$ face of a fluid element in the $j^{th}$ direction $u_i$ is the velocity in the $i^{th}$ direction $x_j$ is the $j^{th}$ direction coordinate Other materials which may be used to adjust viscosity are polypeptides such as abietoyl soy polypeptide, undecilenoyl soy polypeptide, alcohol/glycol soluble prolamine, ethoxylated fatty alcohol, ethoxylated fatty amine, acrylic amide, 2-ethyl-oxazoline homopolymers, copolymer and/or terpolymers.

Depending on the specific viscosity requirement of the printer and/or print head, viscosity control solvents/co-solvents may weigh at least three times as much, and up to twenty times as much, as the heat activated colorant solids of the total formulation weight of the ink in order to maintain both high viscosity and jettability. The total viscosity control solvents/co-solvents may comprise between 15% and 60% of the total formulation by weight.

Other ingredients may be used for stabilizing the colorant, and for fine adjustment of the physical properties of the ink such as surface tension, pH value, conductivity, and density. Further, non-heat activated dyes and other colorants may be used in combination with the heat activated colorant(s) to enhance image quality and properties in certain applications. Self-dispersing colorants, and/or pre-stabilized colorants may also be used.

Aqueous inkjet inks having the desired viscosity may have different stabilization requirements, due to physical property changes, such as ink density, Brownian movement of the particulates, and electric conductivity. These changes impact the particulate size distribution profile, and especially the upper limit of the particle size distribution requirement. The following empirical equation may be used for help selection of the upper particle size distribution limit, if the particle size distribution does not deviate substantially from a normal distribution model:

$$\phi \geq \left(\frac{5D}{1-f}\right)^3$$

where, $\Phi$ is the narrowest ink pathway inside the print head such as nozzle/orifice diameter (in micron)

D is the particle size presented as 95% from total particle size distribution (in micron)

f is the colorant weight fraction of the total formulation weight (<1)

For example, a print head having 35 micron nozzle/orifice diameter indicates a particle size, at 95% distribution, of equal to or less than 0.62 micron in diameter, if the colorants are 5% of the total weight. This formula helps in creating an ink that will not clog the narrow path inside the print head.

Heat activated colorants suitable for use may include various disperse dyes or sublimation dyes that are activated or sublimed by applying heat to the printed substrate or transfer substrate. Generally, the heat activation temperature does not exceed 450° F., and most preferably, does not exceed 410° F. Examples of colorants, in varying ratios, include but are not limited, to C.I. Disperse Orange 13, 29, 31:1, 33, 49, 54, 55, 66, 73, 119 and 163; C.I. Disperse Red 4, 11, 54, 60 72, 73, 86, 88, 91, 92, 93, 111, 126, 127, 134, 135, 143, 145, 152, 153, 154, 159, 164, 167:1, 177, 181, 204, 206, 207, 221, 258, 278, 283, 288, 311, 323, 343, 348 and 356; C.I. Disperse Violet 33; C.I. Disperse Blue 4, 13, 56, 73, 113, 128, 148, 154, 158, 165, 165:1, 165:2, 183, 197, 201, 214, 224, 225, 257, 266, 267, 287, 358, 359, 360, 379, Disperse Brown 26, 27; and Disperse Yellow 5, 42, 54, 64, 79, 82, 83, 93, 99, 100, 119, 122, 124, 126, 160, 184:1, 186, 198, 199, 204, 224 and 237. Depending on the specific application, other organic and inorganic pigments, and soluble and insoluble dyes, such as direct dyes, acid dyes, reactive dyes, vat dyes, cation dyes, basic dyes, luco dyes, thermochromatic, and photochromatic colorants may also be used.

The colorant will remain as a particulate in order to be heat activated or sublimed. This is not a significant issue for water insoluble colorants, such as sublimation dyes, in lower viscosity applications where little to no glycol or other viscosity increasing agents are present. The difference between the boiling point of water and the ink heat activation temperature, which is typically greater than 50° F., indicates that activation or sublimation of the ink solids will occur after the aqueous components vaporize, so that activation or sublimation is not materially hindered by these components of the ink.

The relatively high concentration of high boiling point of glycols, polyol, and other viscosity control ingredients can create a high boiling system which makes the activation or sublimation of the colorants very difficult. The boiling point may be near, or even above, the heat activation temperature of the dye, such as within 20° F. of the heat activation temperature. Particles with smaller diameters may temporarily, or even permanently, bond with these ingredients and not activate, due to hydrogen bonding, entrapment, or forming a high boiling point co-boiling system. Solvency of the non-polar portion of these ingredients may also contribute to the hindering of the colorant, especially the outside portion of the colorant particulates at a temperature near the boiling point of these solvents or agents. Only the inside portions of the colorant particles, which are not in contact with the "bulk" ingredients of the ink, may activate or sublimate.

In one embodiment of the present invention the particulate size of the heat activated colorants are limited so that sufficient colorant molecules are successfully activated or sublimated. The following model is indicative of the particles sizes of the dye:

$$d \geq \frac{2aTS}{1-K^{1/3}}$$

where, d is the minimum particle size in diameter (in micron) to ensure heat activation efficiency K K is the heat activation efficiency (K<1)

Ts is the molecular size of heat activated colorant in the longest dimension (in nanometer, generally Ts=1.25)

a is the solvency hindering impact parameter, for high viscosity aqueous inks, a>1

For relatively high viscosity inks having more than 20% by weight of high viscosity solvent, a =3, meaning about three layers of molecules of the colorant particulate may be hindered. Therefore, the relationship between the particle size and heat activation efficiency can be defined as:

$$d \geq \frac{7.5}{1-K^{1/3}}$$

where, d is the minimum particle size in diameter (in micron) to ensure heat activation efficiency K K is the heat activation efficiency (K<1)

One embodiment of the invention has a heat activation efficiency higher than 65% (K) for the colorant particulates. Substantially all particles of the colorant having a diameter of less than 50 nanometers are excluded from the ink. The low transfer efficiency caused by the high concentration of the viscosity control solvents/co-solvents to these particulates is thereby substantially eliminated.

The present invention may be used with inkjet inks for continuous inkjet, drop-on-demand thermal or bubble inkjet, drop-on-demand piezo electric, ultrasonic or mechanical inkjet printhead delivery systems. Physical properties of the ink may be adjusted suitable for specific printhead requirements. A preferred printer for printing an ink according to the invention is a RICOH GELSPRINTER inkjet printer, which is designed to print OEM inks having a viscosity of about 7. This printer is known in the industry as a printer for high viscosity inks. Inkjet printers designed for inks having a viscosity of 5.0 or greater are preferred.

Heat activation is according to known processes for heat activation of the dyes. For example, a heat press may be used to activate and/or transfer inks comprising sublimation dyes according to the teachings of Hale, U.S. Pat. No. 5,488,907.

The follow examples illustrate the general composition of the high viscosity heat activated ink.

Example 1

An ink for use with a Ricoh GelSprinter ink jet printer, nozzle size 35 microns, and having a viscosity of about 7.5 cPs:

| Ingredient | Weight % |
| --- | --- |
| Disperse blue dye (pre-stabilized) | 3.5% |
| Glycerin | 40% |
| Poly(2-ethyl-oxazoline) | 2% |
| Non-ionic Surfactant | 3.5% |

-continued

| Ingredient | Weight % |
| --- | --- |
| Proxel GXL | 0.1% |
| Other agents | 2.0% |
| De-ionized Water | balance |

The ink according to the example is produced with an upper limit (95%) of particles at 0.3 micron and a lower limit to 0.05 micron. Transfer printing of an image printed with the ink on polyester fabric using 400° F., with a 35 second heat activation time produces an image having an optical density (cyan) of 1.25 or greater as measured by an X-Rite densitometer.

Example 2

An ink for use with a Spectra Skywalker inkjet printer, nozzle size 45 microns, and having a viscosity of about 15 cPs:

| Ingredient | Weight % |
| --- | --- |
| Disperse dye mixture (pre-stabilized) | 5.6% |
| CAB-O-JET ® aq. Black pigment dispersion | 1.5% |
| Diethylene Glycol | 20% |
| e-caprolactam | 15% |
| Non-ionic Surfactant | 3.5% |
| Proxel GXL | 0.1% |
| Other agents | 2.0% |
| De-ionized Water | balance |

This ink has a particle upper limit (95%) at 0.6 microns, and a lower limit to 0.05 microns. Direct printing onto polyester/cotton (50/50) with heat activation of the dye at 410° F., at 30 seconds, produces an image with an optical density of 1.30 or greater as measured by an X-Rite densitometer.

What is claimed is:

1. An ink jet printer ink having heat activated colorant solids, comprising:

water;

heat activated colorant solids; and a viscosity control agent comprising not less than 15% by weight of the liquid ink, wherein the liquid ink has a viscosity of not less than 6.0 centipoise, wherein the heat activated colorant solids are sparingly soluble in the viscosity control agent, and wherein an upper limit of a distribution of particle sizes of particles of the heat activated colorant solids is a function of both the smallest orifice of the print head of an ink jet printer used to print the liquid ink and the ratio of the total weight of the heat activated colorant solids to the total weight of the liquid ink formulation.

2. An ink jet printer ink having heat activated colorant solids as described in claim 1, wherein the viscosity control agent increases the liquid ink to a viscosity of at least 6.0 centipoise and the weight of the viscosity control agent present in a volume of heat activated ink is at least three times the weight of the heat activated colorant present in the volume of heat activated ink.

3. An ink jet printer ink having heat activated colorant solids as described in claim 1, wherein the viscosity control agent is glycol and the glycol increases the liquid ink to a viscosity of at least 6.0 centipoise and the weight of the glycol present in a volume of heat activated ink is at least three times the weight of the heat activated colorant present in the volume of heat activated ink.

4. An ink jet printer ink having heat activated colorant solids as described in claim 1, wherein the viscosity control agent increases the liquid ink to a viscosity of at least 6.0 centipoise and the weight of the viscosity control agent present in a volume of heat activated ink is 15-60% of the total weight of the volume of heat activated ink.

5. An ink jet printer ink having heat activated colorant solids as described in claim 1, wherein the heat activation temperature of the colorant is not substantially higher than the boiling point of the viscosity control agent.

6. An ink jet printer ink having heat activated colorant solids as described in claim 1, wherein the heat activation temperature of the colorant is not more than 20 degrees Fahrenheit higher than the boiling point of the viscosity control agent.

7. jet printer ink having heat activated colorant solids as described in claim 1, wherein substantially all particles of the colorant having a diameter of less than 50 nanometers are excluded from the ink.

8. An ink jet printer ink having heat activated colorant solids as described in claim 1, wherein the heat activated colorant solids are sublimation dye solids.

9. An ink jet printer ink having heat activated colorant solids as described in claim 1, wherein the ink further comprises pigments.

10. An ink jet printer ink having heat activated colorant solids as described in claim 1, wherein the ink comprises not less than 30% water.

11. An ink jet printer ink having heat activated colorant solids as described in claim 1, wherein not less than 95% of particles of heat activated colorant solids have a diameter of 0.05 microns or greater.

* * * * *